Sept. 13, 1932.  A. F. STUBENBERG  1,877,078
AGRICULTURAL MACHINE
Filed April 8, 1931  5 Sheets-Sheet 1
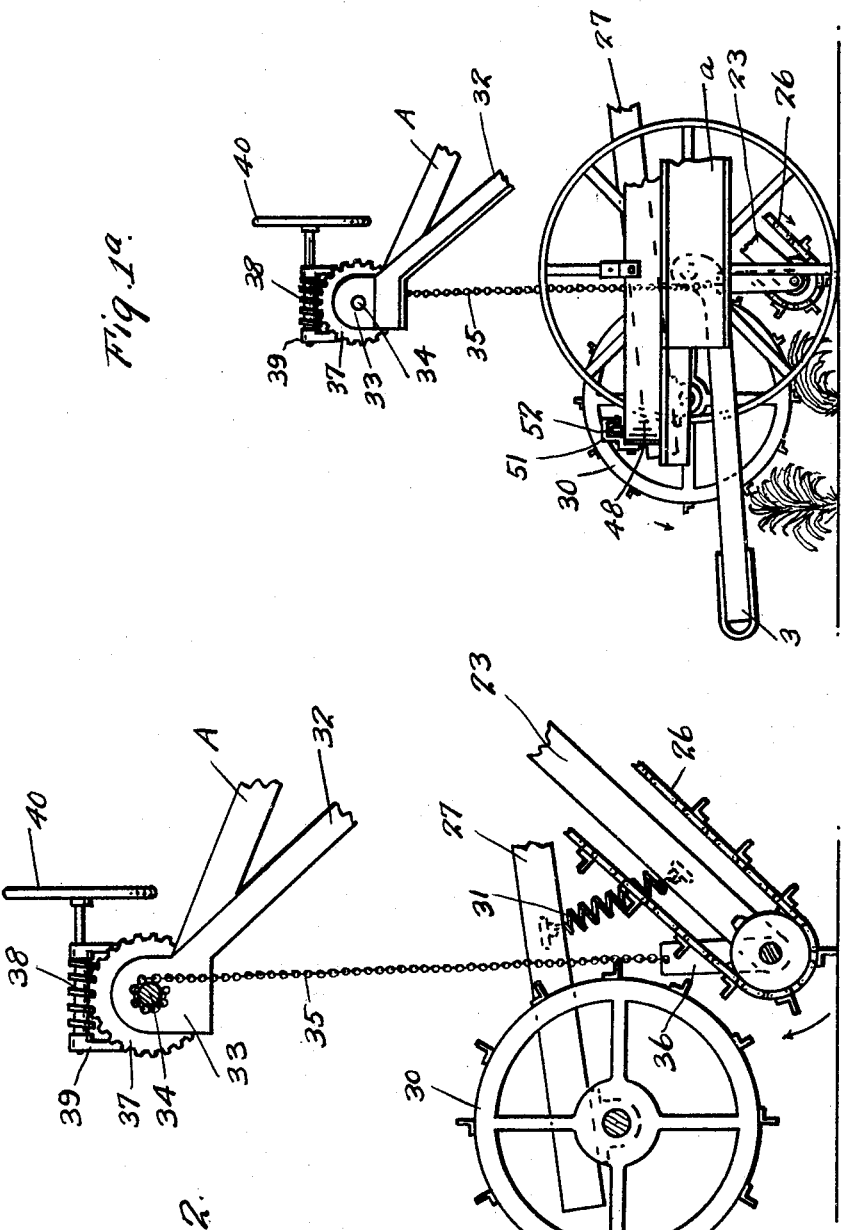
Inventor
A. F. Stubenberg
By Clarence A. O'Brien
Attorney

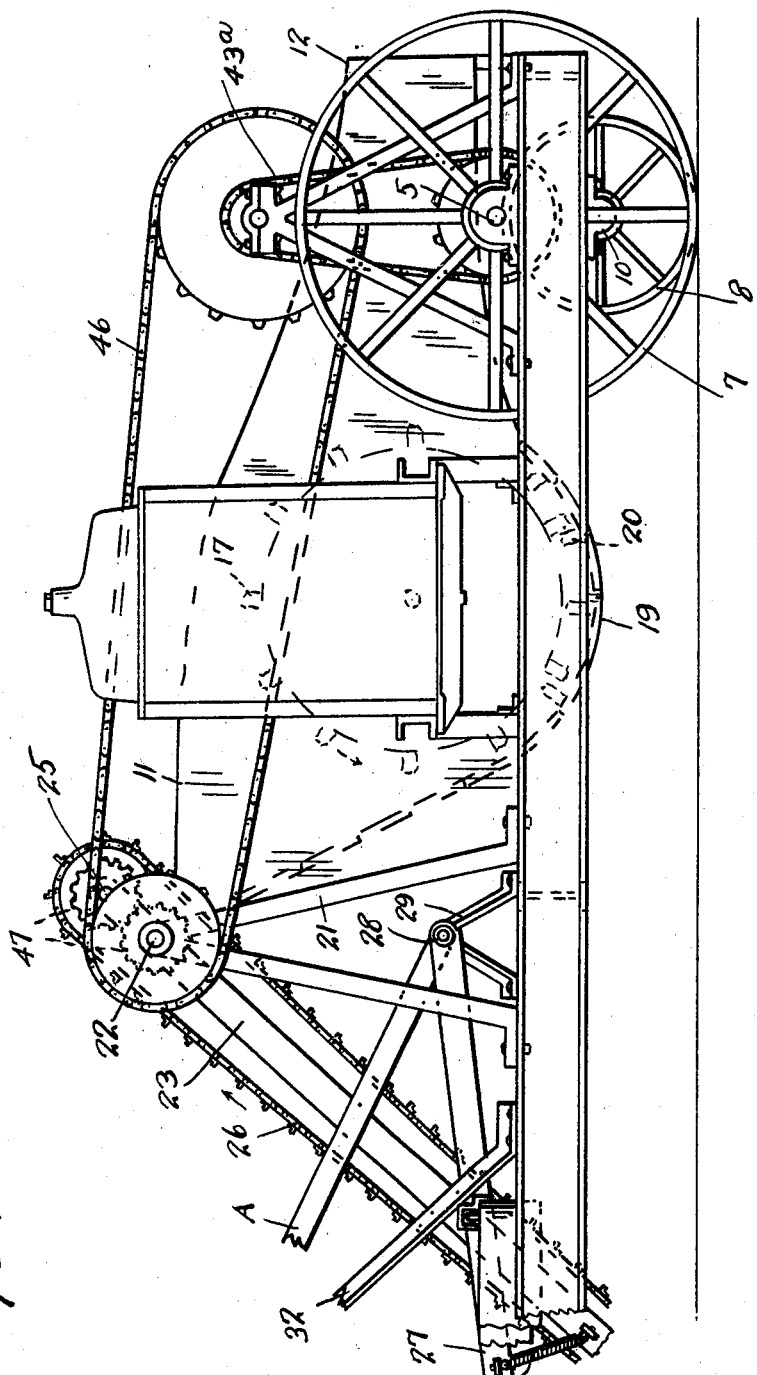

Sept. 13, 1932.  A. F. STUBENBERG  1,877,078
AGRICULTURAL MACHINE
Filed April 8, 1931  5 Sheets-Sheet 3
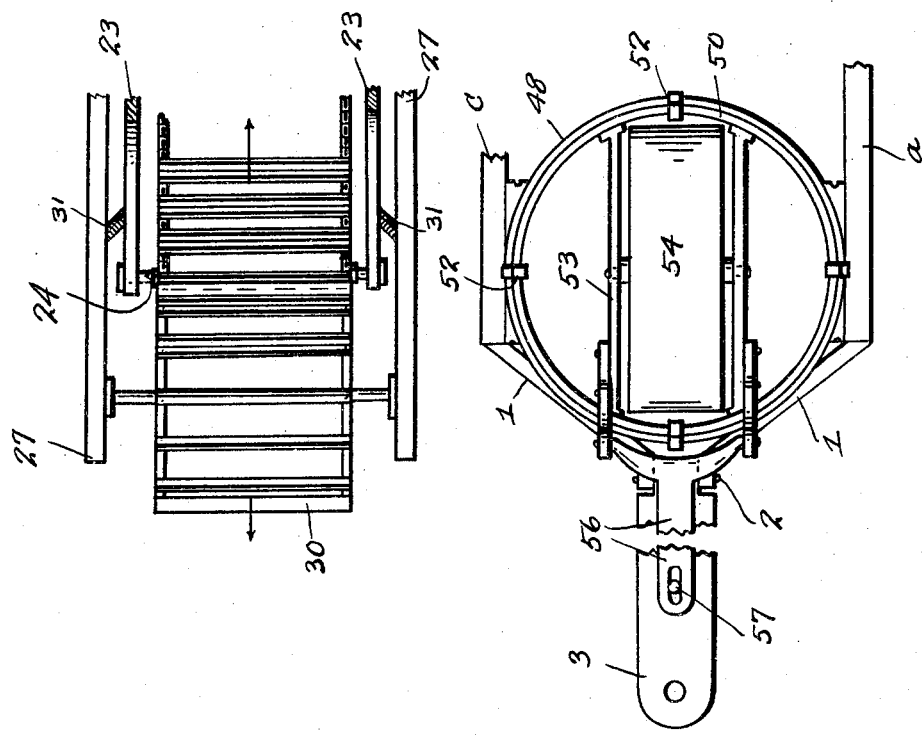
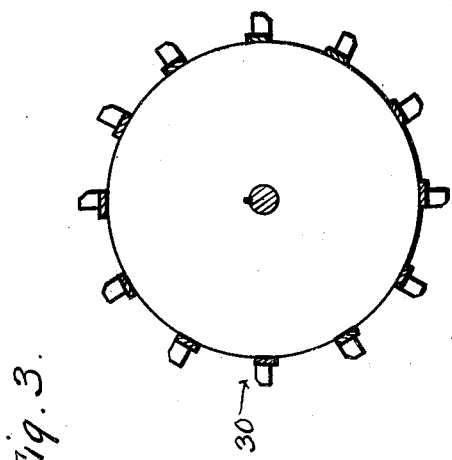
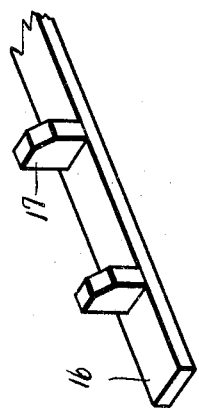
Inventor
A. F. Stubenberg
By Clarence A. O'Brien
Attorney

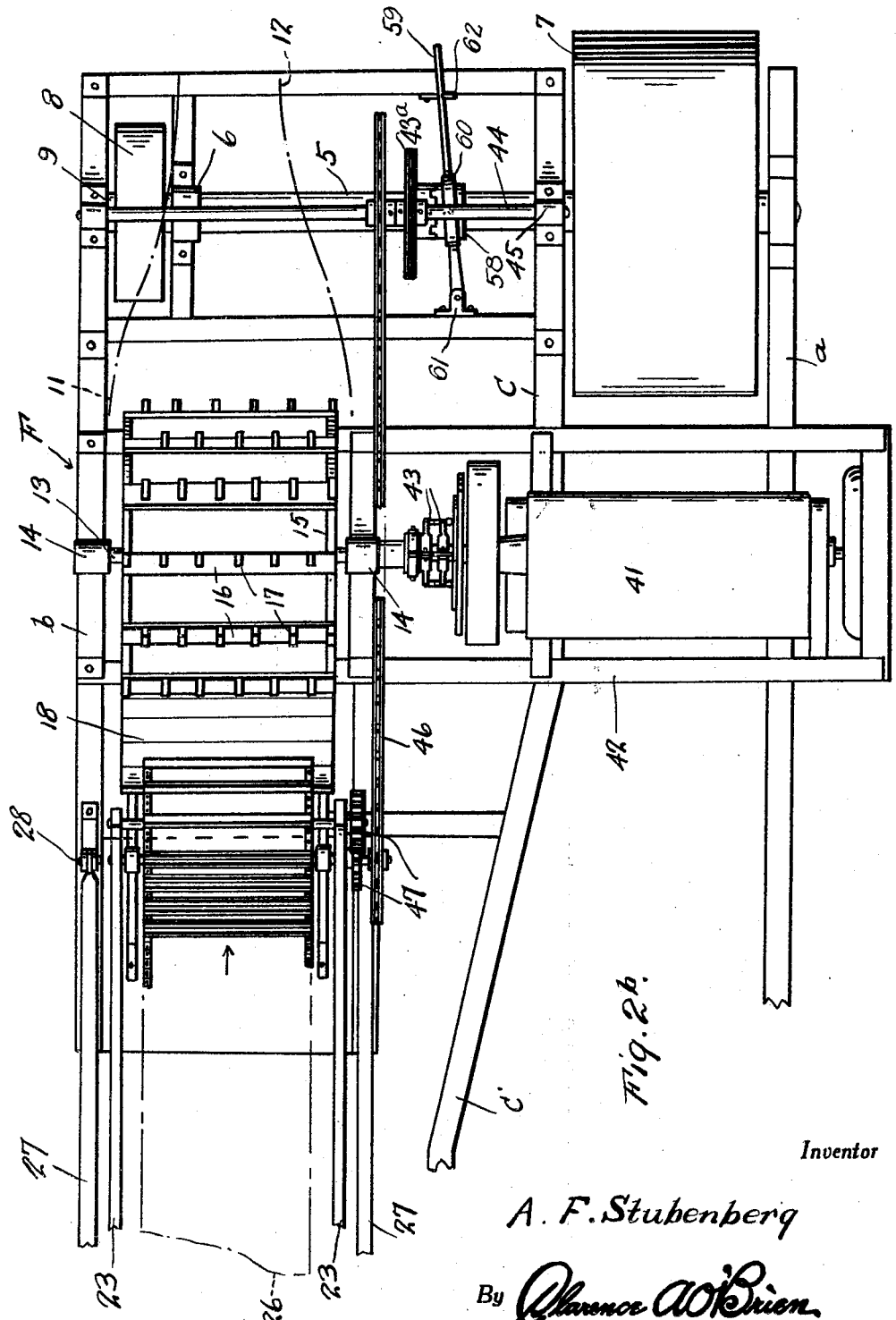

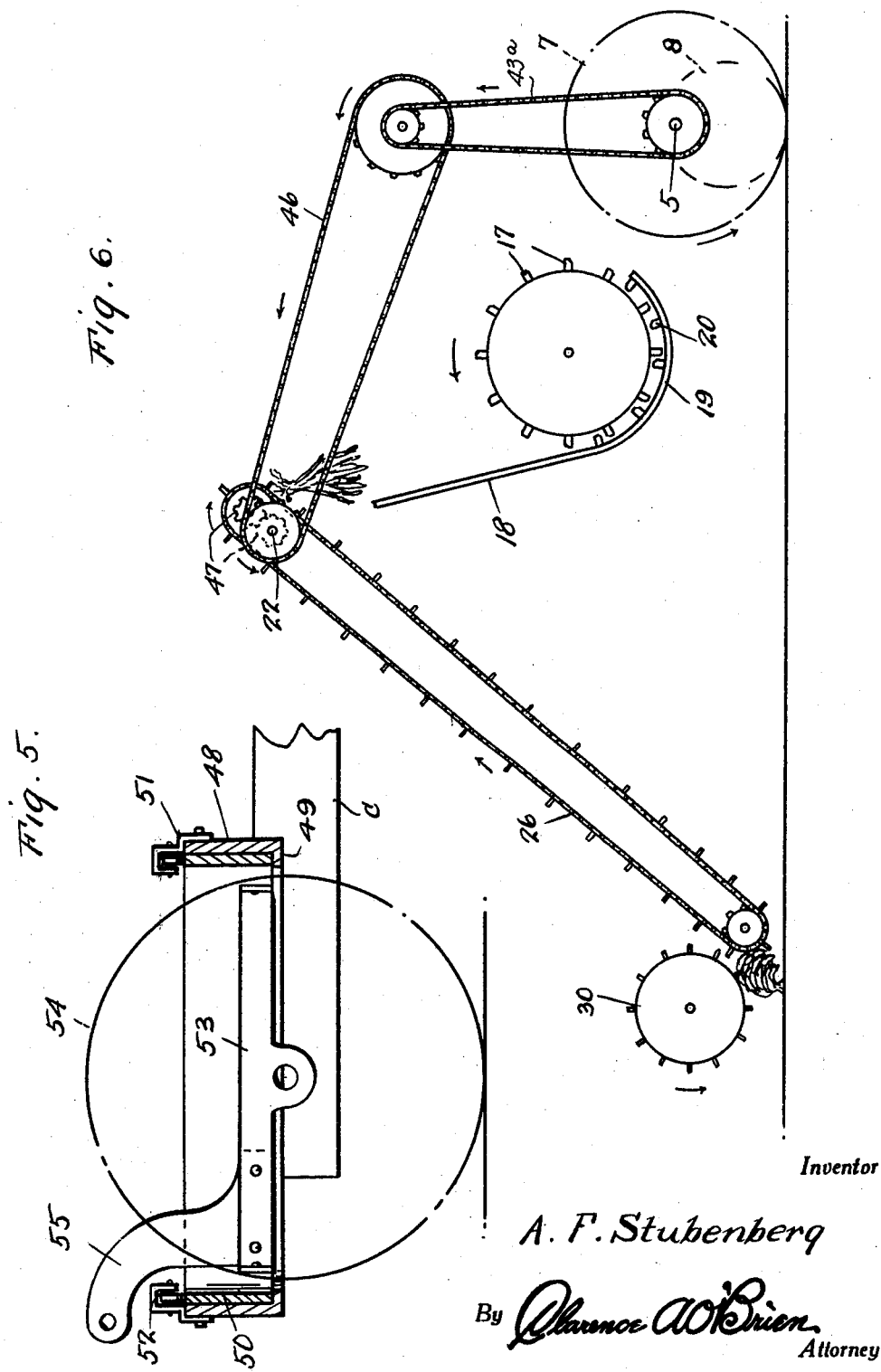

Patented Sept. 13, 1932

1,877,078

UNITED STATES PATENT OFFICE

ARTHUR F. STUBENBERG, OF HONOLULU, TERRITORY OF HAWAII

AGRICULTURAL MACHINE

Application filed April 8, 1931. Serial No. 528,651.

This invention relates to certain new and useful improvements in agricultural machines.

It has been the practice, in the Hawaiian Islands, to disk down and burn old pineapple fields to get rid of the trash, but there was always considerable of it which would not burn, especially that part known locally as the stumps.

These were either hauled off the field or plowed under. The stumps which are plowed under do not decay very rapidly and therefore harbor many pests which are very injurious to growing plants. Disking down, burning and hauling off trash is quite an expensive operation so that the idea was conceived to shred the old plants and then burn or plow under the shredded material. This material will decay very rapidly and has considerable value when turned back into the soil and this latter method may be accomplished at a considerable saving in cost over the old method.

It is therefore a primary object of the present invention to provide a machine for picking up the plants standing or windrowed, shred them and subsequently broadcast the shredded material.

Other objects and advantages of the invention, and the invention itself will be better understood from a study of the following description taken in connection with the accompanying drawings:

Figure 1a is a fragmentary side elevational view of the front end portion of the machine.

Figure 1b is a fragmentary side elevational view of the rear portion of the machine.

Figure 2 is a view similar to Figure 1a enlarged, and certain parts being removed, and other parts shown in elevation for clearly disclosing the invention.

Figure 2a is a top plan view of the front end portion of the machine.

Figure 2b is a top plan view of the rear portion of the machine.

Figure 3 is a sectional elevational view through the threshing cylinder.

Figure 4 is a fragmentary perspective view of a toothed bar of the shredder cylinder.

Figure 5 is a sectional elevational view taken through the swivel wheel construction.

Figure 6 is a diagrammatic view for clearly illustrating the mechanism for gathering and threshing the material.

With reference more in detail to the drawings, it will be seen that the machine comprises a truck including a main frame F. A rear axle 5 is journalled transversely of the frame in bearing brackets 6. Mounted on the axle 5 for rotation therewith and located adjacent the side $a$ of the frame is a relatively large tread wheel 7. A relatively small wheel 8 is journalled in a transverse stub axle 9 journalled in suitable bearings 10. Wheel 9 is located adjacent the side $b$ of the frame.

Suitably supported on frame F adjacent the side $b$ of the frame and extending from a point intermediate the frame to the rear end of the frame is a casing or housing 11 the same being provided with an inlet at its front end, and tapering toward its rear end to terminate in a contracted discharge mouth 12 at the rear end of the frame.

Suitably journalled in the housing or casing 11 adjacent the rear end of the housing is a shaft 13, bearings 14 being provided therefor. Mounted on the shaft 13 for rotation therewith is a threshing cylinder, the same comprising a pair of end plates 15 connected by an annular series of circumferentially spaced bars 16 each of which is provided with threshing teeth 17.

Mounted in the forward end of the housing or casing 11 and extending downwardly and rearwardly from the upper forward portion thereof is a chute or plate 18 which at its lower end terminates beneath the threshing cylinder, in a concave 19. The concave 19 is provided with suitable teeth 20 for cooperation with the teeth 17 of the threshing cylinder.

Mounted on the frame F adjacent the forward end of the casing or housing 11 is a pair of vertically opposed bearing brackets 21 which support between their upper ends a rotatable shaft 22. Hingedly supported by shaft 22 is an endless conveyor, the same comprising a pair of parallel side bars 23. Bars 23 adjacent their upper ends are suitably apertured for accommodating shaft 22 whereby the bars may be swung relative to said shaft.

Suitably mounted between the bars 23 is a rearwardly inclined endless conveyor of any desired structure, the shafts 24, 25 at the respective ends of the conveyor being suitably journalled between the bars 23. The endless apron of the conveyor is designated by the reference character 26.

A pair of oppositely disposed longitudinally extending bars 27 are apertured at one end for hinged connection with a shaft 28 journalled between a pair of relatively short bearing brackets 29 mounted on the frame F adjacent the brackets 21. The forward free ends of the bars 27 terminate forwardly of the frame F, and support between said ends in advance of the lower end of the endless conveyor, an idly mounted toothed drum or cylinder 30. Drum or cylinder 30 is adapted to cooperate with the toothed or ribbed apron 26 of the endless conveyor for gathering on to the conveyor the pineapple stumps in the manner suggested in Figure 6. Yieldable members, preferably in the nature of cushion springs 31 connect the bars 27 (said bars serving as a pivoted supporting means for the drum or cylinder 30) with the side rails 23 of the endless conveyor, so that it will be evident, as the machine travels over the ground, the lower end of the conveyor will rise and fall in accordance with the contour of the ground.

Suitably mounted on the frame F and on opposite sides of the endless conveyor are posts 32 that extend upwardly and forwardly from the frame and at their upper ends terminate in bearings 33, braced by bars A. Supported between the bearings 33 is a winch or drum 34 on which is windable a flexible element such as a chain 35. Chain 35 at its free end is secured to a bracket 36 provided at the lower end of one of the side rails 23 of the endless elevator. Winch 34 is provided with a worm wheel 37 that is in mesh with a worm 38 journalled between a pair of brackets 39 suitably provided adjacent one of the bearings 33. The shaft of the worm 38 is provided with a hand wheel 40. Obviously by proper manipulation of hand wheel 40, the lower end of the elevator may be raised or lowered with respect to the ground as may be necessary, and as will be required according to the length of the pineapple stumps being gathered.

The threshing cylinder mounted within the casing 11 is driven directly from a suitable prime mover 41 mounted transversely of the frame F on a suitable frame bed 42 provided for the prime mover. The shaft 13 of the threshing cylinder is connected with the crank shaft of the internal combustion engine or prime mover 41 through the medium of a suitable clutch mechanism 43.

The endless conveyor has its power transmitted thereto from the rear axle 5 in the following manner: Rear axle 5 has a chain and sprocket connection 43a with a shaft 44 mounted above the axle 5 and supported in the upper end of bearing standard 45 rising from the frame F. Shaft 44 transmits its movement to shaft 22 through the medium of suitable chain and sprocket mechanism 46. Shaft 22 in turn transmits its movement to shaft 25 of the endless conveyor through the medium of suitable gearing 47. Thus it will be seen, that as the machine is drawn over the ground by suitable draft means power will be transmitted to conveyor shaft 25 for actuating the conveyor, causing the same to travel in the direction indicated by the arrows in Figures 1b and 2b.

Thus in the operation of the device, it will be seen that that threshing cylinder being driven from the prime mover, and the endless conveyor being driven from the rear axle of the machine the heads of the stumps will be gathered by drum 30 operating in conjunction with the apron 26 of the endless conveyor and the stumps thus gathered are carried upwardly and rearwardly to the casing 11.

The pineapple stalks from the endless conveyor are then fed to the casing 11 and pass through the casing between the concave 19 and the threshing cylinder so that the stalks are thoroughly shredded and the shredded material subsequently passes out of the casing through the discharge mouth 12 thereof to be distributed over the ground. The shredded material thus distributed over the ground will mingle with the soil when the ground is being cultivated, and acts as a fertilizer for the soil.

The side $a$ of frame F at its forward end extends forwardly beyond the side $b$ of the frame. An intermediate frame bar $c$ is interposed between the sides $a$ and $b$ of the frame and at its rear end is parallel with said sides $a$ and $b$. Intermediate its ends, the bar $c$ is offset away from the side $a$ as at $c'$ and then continues longitudinally in parallelism with the forward free end of side $a$. (See Figs. 2a and 2b.)

Side $a$ and frame bar $c$ at said forward end have terminals 1 converging toward one another, and between the ends of the terminals 1 is pivoted as at 2 a draw bar 3. Draw bar 3 is adapted to be coupled to the rear end of a tractor or other suitable draft vehicle and as will be noted, draw bar 3 is disposed at one side of the longitudinal median of the truck.

Swivelly mounted between side $a$ and bar $c$ at the forward ends thereof is a guide wheel structure, the same comprising an annular member 48 provided at its lower end with an inwardly directed flange 49. Supported on the flange 49 and arranged with the annulus 48 is an annulus or ring 50. Brackets 51 are arranged in circumferential spaced relation on the annulus 48, and these brackets have upper ends offset radially inwardly with respect to the annular member 48, and anti-friction rollers 52 are journalled in said ends for engagement with the upper edge of the annulus or ring 50.

Fixedly mounted within the ring 50 is a pair of spaced parallel bars 53 provided intermediate their ends with bearings for accommodating the axle of a wheel 54. Each of the bars 53 has rising from the forward end thereof an angular arm 55, each of the arms at its upper end terminating above the upper edge of annulus 48 and at said ends being apertured for accommodating pintles provided at the ends of the head of a relatively short lever 56. Said lever 56 at its free end has a pin and slot connection 57 with the draw bar 3. It will be noted that the gathering and threshing mechanism of the machine is so mounted on the frame F as to be disposed laterally of the tractor or other draft means utilized for drawing the frame F over the ground, so that the tractor will not have to pass over the standing stumps or plants.

In order to permit the machine to be drawn over the ground, without causing operation of the endless elevator, there is provided suitable clutch means which includes a clutch member 58 that is slidably keyed to axle 5 and is capable of moving into and out of engagement with a complemental clutch member integral with a sprocket of the chain and sprocket mechanism 43a, which sprocket of said mechanism is loose on axle 5. An actuating lever 59 for the clutch member 50 has an intermediate portion 60 thereof embracing the clutch member 58 and pivotally connected thereto. One end of the clutch operating rod 59 is pivotally mounted to a fixed bracket 61 suitably supported in the frame F.

The free end of the lever 59 is engaged with a suitable catch 62 also suitably mounted in the frame F. It will be apparent that when lever 59 is engaged with catch 62, clutch member 58 will be retained in engagement with its complemental clutch member for keying the sprocket integral with said complemental clutch member in driven relation with the axle 5.

Even though I have herein shown and described the preferred embodiment of the invention, it is to be understood that the same is susceptible of changes, modifications and improvements coming within the scope of the appended claims.

Having thus described my invention, what I claim as new is:

1. A machine of the character described comprising a wheel supported frame provided at the forward end thereof with means for coupling to a draft vehicle, a casing mounted on said frame and adapted to be disposed laterally of the draft vehicle, said casing being open at its forward end, an endless conveyor pivotally mounted at one end adjacent the forward end of said casing, means for supporting the free end of said conveyor, said means including means for raising and lowering said end of the conveyor, a pair of bars pivoted at one end to said frame and disposed one at each side of said conveyor, a toothed cylinder journalled between the free ends of said bars in operative relation to the free end of said conveyor, and yieldable members connecting said bars with the conveyor.

2. In a machine of the character described, a frame, a transverse axle mounted on said frame adjacent the rear end thereof, said axle terminating inwardly at one end thereof from one side of said frame, a tread wheel mounted on said axle for rotation therewith, for supporting one side of said frame, a stub axle mounted in said frame adjacent the opposite side of said frame, a tread wheel of relatively small diameter mounted on said stub axle for supporting the last referred to side of said frame, a pair of frame members adjacent one side of said frame projecting forwardly beyond the forward end of said frame, a wheel swively mounted between the forward ends of said frame members, draft means at said forward end of said frame members, a casing mounted on said frame at that side of the frame remote from said first mentioned tread wheel, said casing terminating in a discharge mouth at the rear end of said frame, an endless conveyor mounted on said frame forwardly of the casing in substantial alinement with the casing, means for supporting said conveyor at an incline, with the forward end of the conveyor disposed forwardly of the frame and on a plane below the plane of said frame, said casing being open at its forward end for receiving the material from the conveyor, threshing mechanism arranged in said casing, a prime mover mounted on said frame laterally of the casing, clutch means operatively connecting said prime mover with said threshing mechanism, and clutch controlled drive means operatively connecting said first mentioned axle with said conveyor.

3. In a machine of the character described, a wheel supported frame, a casing mounted adjacent one side of the frame and extending longitudinally thereof, a conveyor pivotally mounted adjacent the forward end of the frame for conveying material to the casing, a toothed drum mounted in operative position to the conveyor, pivoted supporting means for the drum, yieldable devices connecting said means with the conveyor, and threshing mechanism arranged in said casing, a prime mover mounted on said frame laterally of the casing, and having driving connection with said threshing mechanism.

4. In a machine of the kind described, in combination, a truck, a draw bar extending from the forward end of the truck and arranged at one side of the longitudinal median of the truck, a casing on the truck and arranged at a relatively opposite side of the longitudinal median of the truck, a rearwardly inclined conveyor mounted on the truck forwardly of said casing, an idly mounted toothed drum arranged in operative position with respect to the lower end of the conveyor, supporting means for said drum, threshing mechanism arranged in said casing, and driving means for the threshing mechanism mounted on the truck laterally of the casing.

5. In a machine of the class described, in combination, a truck, a draw bar extending forwardly from the truck and arranged at one side of the longitudinal median of the truck, gathering and threshing mechanism mounted on the truck and arranged at the relatively opposite side of the longitudinal median of the truck, and said mechanism including a casing having an inlet at the forward end thereof, and a discharge mouth at the rear end thereof, a pivotally mounted conveyor having its pivoted end arranged adjacent the inlet of the casing, a toothed drum arranged adjacent the lower end of the conveyor, a pivotally mounted support for the drum, a lifting device suspending the free end of the conveyor from the truck, a concave in the casing, a threshing cylinder journalled in the casing in operative position to the concave, and an inclined chute extending to the concave from the forward open end of the casing.

In testimony whereof I affix my signature.

ARTHUR F. STUBENBERG.